United States Patent
Michalk (10) Patent No.: US 9,935,433 B2
(45) Date of Patent: Apr. 3, 2018

(54) METHOD TO STRIP A PORTION OF AN INSULATED WIRE

(71) Applicant: HID Global GmbH, Walluf (DE)

(72) Inventor: Manfred Michalk, Erfurt (DE)

(73) Assignee: HID GLOBAL GMBH, Walluf (DE)

( * ) Notice: Subject to any disclaimer, the term of this patent is extended or adjusted under 35 U.S.C. 154(b) by 57 days.

(21) Appl. No.: 15/251,974

(22) Filed: Aug. 30, 2016

(65) Prior Publication Data
US 2016/0372901 A1 Dec. 22, 2016

Related U.S. Application Data

(62) Division of application No. 12/699,474, filed on Feb. 3, 2010, now Pat. No. 95,311,171.

(30) Foreign Application Priority Data

Feb. 6, 2009 (CH) ........................ 0178/09

(51) Int. Cl.
*H01Q 1/38* (2006.01)
*H02G 1/12* (2006.01)

(52) U.S. Cl.
CPC ............. *H02G 1/1256* (2013.01); *H01Q 1/38* (2013.01); *H02G 1/1248* (2013.01); *H02G 1/1285* (2013.01); *Y10T 29/4517* (2015.01); *Y10T 29/49989* (2015.01)

(58) Field of Classification Search
CPC .................................. H01Q 1/38; H02G 1/12
USPC ....................................................... 343/741
See application file for complete search history.

(56) References Cited

U.S. PATENT DOCUMENTS

| | | |
|---|---|---|
| 3,780,928 A | 12/1973 | Shirn |
| 4,031,612 A | 6/1977 | Nicolas |
| 4,693,778 A | 9/1987 | Swiggett et al. |
| 4,761,535 A | 8/1988 | Lawson |
| 4,970,367 A | 11/1990 | Miller |
| 5,138,910 A | 8/1992 | Ishikawa et al. |
| 5,189,786 A | 3/1993 | Ishikawa et al. |
| 5,541,399 A | 7/1996 | De Vall |
| 6,088,230 A | 7/2000 | Finn et al. |
| 6,233,818 B1 | 5/2001 | Finn et al. |
| 6,936,761 B2 | 8/2005 | Pichler |
| 7,317,171 B2 | 1/2008 | Wiley |
| 2010/0201586 A1 | 8/2010 | Michalk |

FOREIGN PATENT DOCUMENTS

| | | |
|---|---|---|
| DE | 2914184 | 10/1980 |
| DE | 3520322 | 12/1986 |
| DE | 102006060385 | 11/2007 |

(Continued)

OTHER PUBLICATIONS

Search Report prepared by the Swiss Patent Office dated Apr. 22, 2009 for Application CH00178/09, 2 pages.

(Continued)

*Primary Examiner* — Andrea Lindgren Baltzell
(74) *Attorney, Agent, or Firm* — Sheridan Ross P.C.

(57) ABSTRACT

According to the method of stripping a portion of a wire of the invention, the insulated wire including the wire core are first flattened before the insulation is stripped away. The flattening eases the stripping as the insulation is partially cracked and dissociated of the wire core, and the stripping is more efficiently applied on a flat surface. A wire stripping machine and a transponder antenna with stripped portions are also claim as being part of the invention.

20 Claims, 4 Drawing Sheets

(56) References Cited

FOREIGN PATENT DOCUMENTS

| EP | 1868140 | 12/2007 |
|---|---|---|
| GB | 1300934 | 12/1972 |
| GB | 1595317 | 8/1981 |
| WO | WO 93/18493 | 9/1993 |
| WO | WO 2007/134590 | 11/2007 |

OTHER PUBLICATIONS

Search Report and Opinion for European Patent Application No. 10152213.4, dated Jun. 16, 2011, 6 pages.
Official Action (Restriction Requirement) for U.S. Appl. No. 12/699,474, dated Aug. 24, 2012, 6 pages.
Official Action for U.S. Appl. No. 12/699,474, dated Nov. 19, 2012, 8 pages.
Official Action for U.S. Appl. No. 12/699,474, dated Mar. 19, 2013, 6 pages.
Official Action (Examiner's Answer) for U.S. Appl. No. 12/699,474, dated Nov. 4, 2013, 10 pages.
Official Action (Appeal Decision) for U.S. Appl. No. 12/699,474, dated Apr. 21, 2016, 5 pages.
Official Action for U.S. Appl. No. 12/699,474, dated May 13, 2016, 4 pages.
Notice of Allowance for U.S. Appl. No. 12/699,474, dated Aug. 22, 2016, 6 pages.

METHOD TO STRIP A PORTION OF AN INSULATED WIRE

CROSS-REFERENCE TO RELATED APPLICATIONS

This application is a divisional application of U.S. patent application Ser. No. 12/699,474 filed Feb. 3, 2010 entitled "Method to Strip a Portion of an Insulated Wire," which claimed the benefit of Swiss Patent Application No. CH 0178/09 filed Feb. 6, 2009 under 35 U.S.C. § 119, the disclosures of both applications are incorporated herein by reference.

FIELD OF THE INVENTION

The present invention relates to a method to strip a portion of an insulated wire and a machine carrying out this method. This method is advantageously used for the manufacturing of electronic components like transponders, whose antenna is commonly made of very thin insulated wires, more particularly in the case of embedded wire antennas for HF transponders.

STATE OF THE ART

Wire stripping per se is as old as the use of insulated wire. Electric and electronic engines and devices are commonly using insulated wires the ends of which have to be stripped in order to realize an appropriate electrical connection. In case of electrical installations, this is commonly achieved by hand tools comprising a pair of stripping jaws manually activated. In case of industrial production, automatic machines have been developed to cut, strip and handle continuous insulated wires on a very high frequency base.

In the last decades, numerous machine to strip a portion of a continuous insulated wire have been proposed using laser, electrical arc or flames as stripping means. Example of these are given in U.S. Pat. Nos. 4,761,535, 4,970,367 and 7,317,171, respectively.

In the manufacturing of small electronic components, a difficulty resides in the extremely small diameter of the wires used, in the high numbers of connections to be made in a very short time and in the very reduced space available. Additionally, security (for the handling of laser, flames or gases) or quality (strict handling of the stripped insulation particles in order to keep clean rooms) requirements make that available solutions are not always scalable (in terms of yield, costs and ease to use) for high production volume. Stripping solutions as proposed in U.S. Pat. Nos. 4,693,778 or 4,031,612, for example, and which are integrated in the manufacturing device, are not working at full satisfaction.

A domain which is of most interest for the present applicant and where the above-mentioned issues are critical is the manufacture of RFID transponders, in particular where the antenna to be connected to the RFID chip is formed by an insulated wire.

The examples and preferred embodiments of the invention described and claimed further in present application refer specifically to this field. However this should not be understood as a general limitation of the scope of the invention which can as well be applied to numerous other technical domains.

A prior art in this field is illustrated in EP0756736 (corresponding to WO 93/18493), where the problem of connecting an insulated copper wire directly to an IC is solved through the prior removal of the insulation of the wire by means of a hot gas jet (from 500 to 850 degrees C.). An inert gas is preferably used to prevent oxidation of the copper. Then the bare local portion of the wire can then be connected to the IC pads by means of one of the following joining techniques: ultrasonic welding, thermo-compression welding, soldering or gluing for example. Alternatively, in this prior art, it is mentioned that the insulation material of the wire can be removed simultaneously with the actual jointing process by using the increased temperature of the jointing process itself.

In U.S. Pat. No. 6,088,230 and German Patent DE102006060385, the antenna is formed by embedding an insulated wire on a support previous to the connection to the chip or the chip module. It is proposed in particular to integrate a laser stripping chamber in the embedding head in order to be able to strip the wire on demand before that the wire is embedded in the support, the bonding laser doubling as a wire stripper (in U.S. Pat. No. 6,088,230).

Finally, the used wire stripping techniques have not be proven to be effective enough for high production volume and for the most currently used bonding technique, that is the direct thermo-compression of an insulated portion of wire as described in U.S. Pat. No. 6,233,818. The insulated portion of the wire is pressed directly against the contact pad of the chip or the chip module by a thermode which is shortly heated over 1,000 degrees C. This results first in the disruption/consumption of the insulation layer (usually a lacquer) in the heated zone, and then in the creation of a soldering connection and/or a diffusion welding between the materials forming the contact pad and the wire. The drawback of this method is that the extremely intense heat impulse creates a thermo shock which geometrically, mechanically and/or chemically modifies the structure of the thermode, of the module and/or of the substrate around. This induces additional production costs and creates residual stresses in the products that affect the final product (surface of a card for example).

An alternative is proposed in WO2007134590, where a soldering head is applied in such a manner on the insulated wire that the insulation layer is also disrupted/consumed/molten. This solution has essentially the same drawbacks as the previous one, but due in this case to a too long exposure of the different elements at high temperatures.

Accordingly, if in theory the stripping of portion of wire is a desired feature in the process of manufacturing transponders with a wire antenna, this principle has not been applied in practice since no known solution has been working at satisfaction for high volume production level.

SUMMARY OF THE INVENTION

It is therefore an aim of the present invention to propose a method to strip a portion of an insulated wire which can be acceptable for high volume production level.

A further aim of the invention is to provide a wire stripping machine which can be integrated in a mass-production line, in particular for the production of RFID transponders, for example in combination with a wire embedding station.

A further objective of the invention is to provide an insulated wire with bare portions which are so formed that this wire can be advantageously used for the manufacture of RFID transponders, in particular high frequency (HF: 3-30 MHz) tags with wire embedded antennas.

An idea of the invention is to deform (for example flatten or squeeze) the said portion of the insulated wire and also the core of the wire before stripping away the insulation. As the insulation layer(s) doesn't (don't) have the same mechanical/elastic/plastic characteristics as the core of the wire, the mechanical deformation (flattening/squeezing) has the double advantage to create cracks in the insulation layer(s) and dissociate it partially from the core of the wire. This greatly eases the stripping action, which is advantageously applied on a flat surface (better achievement as on a round surface).

Another advantage of the method according of the invention is to provide flattened portions of bare wire, i.e. of the core of the wire. This increases the available surface for the electrical contact, which is finally the main purpose of stripping a wire. So the method of the invention allows in addition to create real connection pads along an otherwise insulated wire. The flattened geometry improves the mechanical stability of the connection. It also eases the correct positioning of the bare portion, in particular in regards of stripping only defined surface(s) of this portion (and then orienting the wire accordingly to the bare surface(s)). Additionally, the mechanical deformation of the core also improve the mechanical/structural strength of this portion of the wire, improving his ability to be applied on a substrate and/or to be submitted to a bonding process.

To carry out this method, the insulation should be less deformable(elastically and plastically) than the core of the wire. Preferably, this method concerns also wires with a metallic core (for ex. copper or silver) and at least an insulation layer made of lacquer or enamel. This kind of insulation is preferably applied on very thin wire, typically of less than 250 micrometers, or even about 100 micrometers for the particular application of wire antenna for HF tags.

The first objective of the flattening (creating cracks and dissociating the insulation layer(s)) is typically reached when the width of the wire and of the wire core is increased by about 20% (resp. the thickness decreases by about 20%) at least. Preferably, a flattening grade of about 50% (resp. about 50% width increase) has proven to be a good choice in term of efficiency of the process and stability of the bare portion. Of course, other values are possible within the frame of the present invention.

In a preferred embodiment of the invention, the portion of the insulated wire is flattened by means of a pair of rotating barrels, wherein the distance between the barrels (as the applied pressure on the wire) can be regulated and controlled. This mean is advantageously integrated in manufacture processes working with continuous insulated wires, where such pair of rotating barrels are commonly used as a handling/transport means.

In another preferred embodiment of the invention, the portion of the insulated wire is flattened by means of a press or a hammer, which is activated such as to squeeze the wire on the chosen portion. Such means are advantageously used to disrupt and/or dissociate strong insulation layers (strong lacquers/enamels), in particular by combining a plurality of wire deformations in series. Typically, a first hammer/press deforms and flatten lightly the portion according one direction, and a second hammer/press then flattens the same portion in a direction roughly perpendicular to the first one. This sequence of orthogonal squeezes can be repeated three, four times or more if needed. A challenge for this embodiment is to regulate the press/hammering parameters to the treatment of a continuous wire, in particular to reduce as much as possible the variation of the scrolling speed of the wire.

According a particular embodiment of the invention, the flattening means described above can be equipped with means to crack the insulation. To this effect, the pressure surface of the barrels, presses or hammers used can show special layout profiles to be imprinted in the insulation layer, creating disruptions and weaknesses finally resulting in cracks in these layers.

In a preferred embodiment of the invention, the insulation material is stripped away by mechanical means. Such mechanical stripping means are well know as scrapers and can be generally defined as a pair of jaws. These jaws show scraping edges which can be applied in a controlled manner on the flattened surface surfaces of the said portion of the wire. The mechanical scraping is eased as the insulation material/layer(s) has (have) been already partially disrupted, cracked and/or dissociated during the flattening step and by the flattened geometry of the surface. Special edges made of ceramic material for example can be used. Advantageously, the metallic core of the wire shows no thermal or chemical changes, and even oxidation layers can be scraped away. To improve the cleaning effect of the scraping, a small vibrating movement (longitudinal to the wire axe) can also be given to the scraping edges. This mean is advantageously integrated in manufacture processes working with continuously scrolling wire, as the normal movement of the wire itself is used to create the scraping effect.

In another preferred embodiment of the invention, the insulation material is stripped away by means of laser radiation. This technique is well described in the publications cited above. The geometry of the flattened wire portion can be used advantageously if the laser radiation is oriented approximately perpendicular to the flattened surface to be stripped/cleaned. This allows to have an uniform impact of the laser on a large part of the surface and improves the quality and homogeneity of the stripping result. Advantageously, if the core of the wire is made of copper, the laser ablation process will not modify the chemical structure or any other characteristics of the metal.

Any other flattening means and stripping means known in the art, and their different combinations can be used in the framework of this invention (like for example hot gases, flames or electric arc as stripping means).

It has also to be understood and comprised in the scope of the invention, that only one small part of one of the flattened surfaces of the wire may be stripped/cleaned. This can be desired to simplify the tool, improve the speed of the process or if it is desired to use the insulation on the opposite surface further in the manufacturing process (like in the case of a baked enamel which is used to improve the adhesion of a wire on a substrate).

According a particular embodiment of the invention, a partial stripping means can also be applied on the insulated portion of the wire before the flattening step. This can be for example achieved by means of a usual scraper. This step creates a first breaking zone in the insulation which in turn improves the cracking and dissociation effect of the flattening step. According to different embodiments described previously, one can also imagine a method of the invention with a plurality of successive flattening and stripping steps in any order, the preferred measure being that at least one flattening step is applied before a stripping step.

The invention also concerns a wire stripping machine to strip a portion of a continuous insulated wire according the method describes above. Essentially, this machine comprises at least wire flattening means and wire stripping means, the wire flattening means being placed preferably before the wire stripping means on the treatment line. A unique tool can also be designed to achieve both flattening and stripping actions (for example with a flattening edge followed by a scraping edge). Naturally, such machine should comprises or may be combined with a length measuring means for determining the correct length on which the wire has to be flattened/stripped and this in regards/coordination with further manufacturing steps (as wire embedding for example).

A preferred application of the method of the invention concerns the manufacture of transponder antennas and wire antennas manufactured by such method, in particular for high frequency (HF: 3-30 MHz) tags based on wire embedded antennas. Such flattened and stripped portion on an insulated antenna wire can have a many uses which are detailed further in the present application. They are forming contact pads to connect electronic elements like chips, chip modules, switches, or even other wires. They can also be used to form wire crossing and watermarks for example.

DETAILED DESCRIPTION OF THE INVENTION

The invention will be better understood by the following detailed description taken together with the following drawings.

Figure 1:
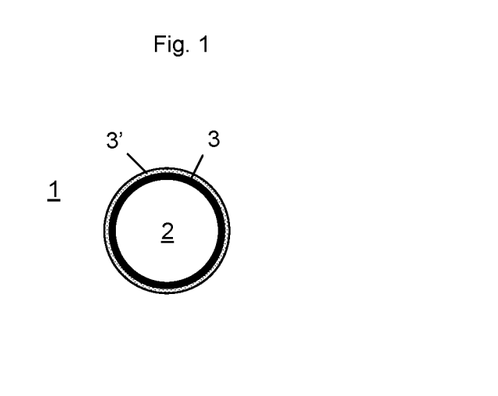
FIG. 1 shows a cross section of an insulated wire.

FIG. 1 shows an insulated wire before being submitted to a stripping step. The wire has a metallic core 2, typically made of copper, surrounded by two successive insulation layers 3, 3'. The first insulation layer 3 is made of a strong lacquer or enamel and forms the base insulation (mechanical and electrical). The second external insulation layer 3' is made of a said baked-enamel which has improved adhesion characteristic. Such a layer is advantageously used to improve the attachment of the layer on a substrate, as for example in case of a wire embedding process. One can also imagine to use thermosetting plastic, adhesive, enamel, etc., as insulation. Any possible combination is to be considered in the scope of the invention. Preferably, at least the insulation layer 3 which is directly in contact with the wire core shows smaller elastic and/or plastic characteristics than the material of the wire core 2.

Figure 2:
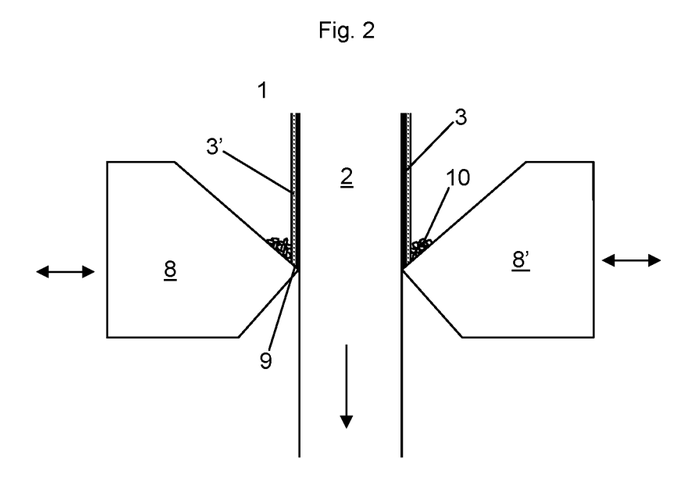
FIG. 2 shows a wire being stripped by a mechanical stripper.

FIG. 2 illustrates the stripping of an insulated wire by a mechanical stripper according to the known state of the art. The insulated wire 1 is pulled through a pair of jaws 8 having scraping edges 9 which can be applied in a controlled manner against the insulated wire. When applied simultaneously on both sides of the wire, the edges 9 penetrate through the insulation layers 3 and 3' and get in contact with the wire core 2. By virtue of the scrolling movement of the wire, and as long as the edges are applied against the wire, particles 10 of the insulation material are being scratched off the wire core surface by the edges 9. The length of the bare portion of wire can be easily calculated by multiplying the wire scrolling speed by the time of application of the edges 9 on the wire.

Figure 3:
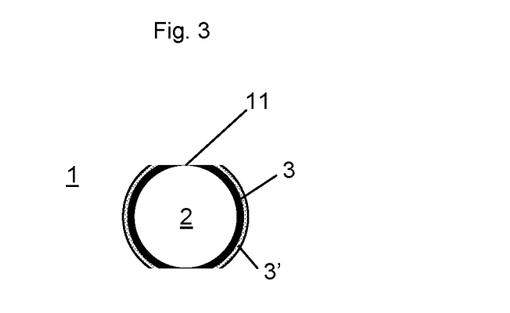
FIG. 3 shows a cross section of a wire stripped without preliminary flattening.

FIG. 3 shows the said portion of bare wire with the wire scraper of FIG. 2 according the known state of the art. The wire core 2 has been stripped bare only along a very thin surface 11 of its perimeter, leaving the insulated layers 3 and 3' intact on a large part of the wire surface. As illustrated in FIG. 3, the scraped profile is flat as the profile of the scraping edges. Naturally, the bare surface could be increased by choosing a curved profile for the edges 9 for example. But then, the work pressure applied by the scraping edges 9 will no more be homogeneous with respect to the radial direction of the surface of the malleable metallic core 2. This would result in uneven scraping and non reproducible results (in term of cleaning/stripping of the wire surface).

It should also be said that the mechanical stripping as shown in FIG. 2 will results mostly in a slight squeezing/flattening of the wire core 2, due to the pressure applied by the scraping edges 9. But contrarily to the invention, both flattening and scraping take place here simultaneously. It will be extremely difficult to produce bare portions of wire with a flattening grade of more 20% with such a simple tool. It is not impossible as the pressure applied and the spacing between the both edges 9 could be regulated adequately. But this will have numerous drawbacks: slowing down of the manufacturing speed, less reproducible results.

In this sense, the method of the invention differs from this state of the art in that at least a flattening step is carried out previously and separately to a stripping step. This allows to control the forming of the wire during the first step, disrupting in the same time the insulation layer in order to facilitate the stripping process which can be applied with less efforts and more precision. However, one can imagine a unique tool achieving both flattening and stripping actions, for example with at least a flattening edge followed by a scraping edge. Such a tool falls under the scope of the present invention, as long as both means/actions are clearly separated. A better result is obtained if the flattening mean and the stripping mean can be controlled separately (force, precision, timing, . . . ).

The following figures illustrates the method of the invention in more detail.

Figure 4:
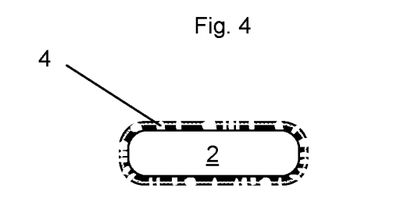
FIG. 4 shows a cross section of a wire after a flattening step of the method of the invention.

FIG. 4 illustrates the state of a portion of the wire after a flattening step but before a stripping step. The wire core 2 has been plastically deformed and does not show any essential structural changes (except for its shape). In contrary, the insulation (layers 3 and 3' of FIG. 1) has been disrupted by the flattening action and forms now a cracked/disrupted layer 4. Of course, the flattening process chosen should be adapted to the materials involved (insulation, core) and to the requirements of the next stripping step. One can use flattening means with imprinting profiles, in order to multiply the cracking/weakness points in the insulation. One can also regulate the speed or the number of the flattening steps in order to reinforce the dissociation of the insulation from the core.

Figure 5:
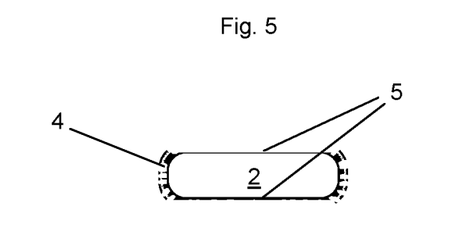
FIG. 5 shows a cross section of a wire after the stripping method of the invention.

FIG. 5 shows the cross section of the same portion of the wire as in FIGS. 1 and 2, but after the stripping step. In this case, the stripping has been applied exclusively on the flat section of wire, stripping the flattened surfaces 5 of the wire core 2. So residual cracked insulation 4 is showed on the side portions. This is only an example, and any variations between the full cleaning of the wire core surface and the scraping of a very limited single surface is possible within the framework of the invention. A preferred embodiment, in particular when a baked-enamel insulation layer 3' is used, is to strip only one of the two flattened wire core surfaces 5.

Figure 6:
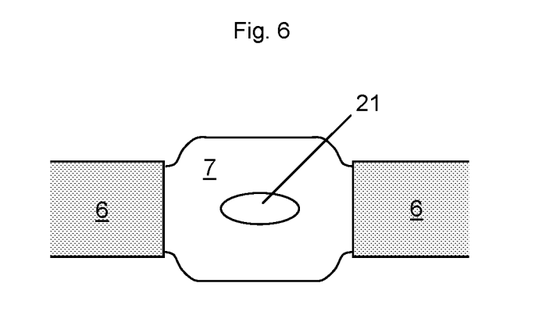
FIG. 6 shows a top view of a stripped portion of a wire according to the invention.

FIG. 6 illustrate schematically the result of the stripping method of the invention, with a top view of a flattened and stripped portion 7 of the wire between two insulated portions 6 of the same wire. In this case, the portions 7 are shown as being totally cleaned of any residual insulation. But as said above (or illustrated in FIG. 3) the invention provides that at least a part of the portion 7 is bare. It could be for example also only a very small area in the center of the portion 7. Optionally, a hole 21 can be formed through the flattened portion 7. This hole 21 can facilitate contacting as is show further in the present description.

Figure 7:
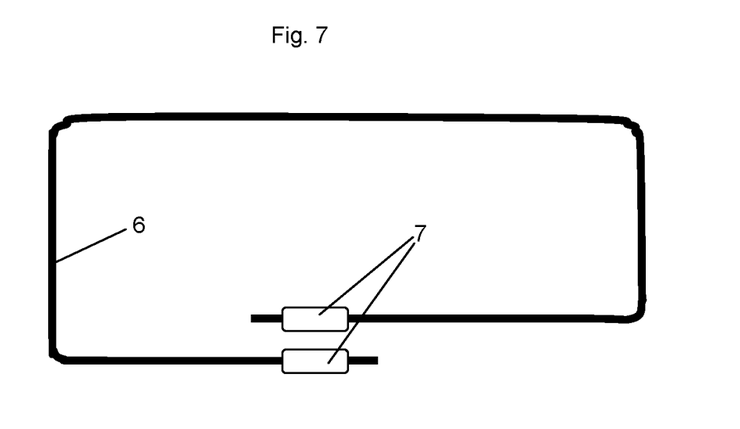
FIG. 7 shows a top view of a wire with two stripped portions according to the invention.

FIG. 7 show an enlarged view of a insulated wire 6 comprising near of each of its extremities a stripped (and flattened) portion 7 according the invention. These portions 7 are typically going to be used as contact pads/surfaces for connecting other electronic elements to the wire 6. In the preferred application described in the present specification, this would be a RFID chip (or chip module) and the wire 6 would be the antenna of the resulting RFID transponder/tag.

Figure 8:
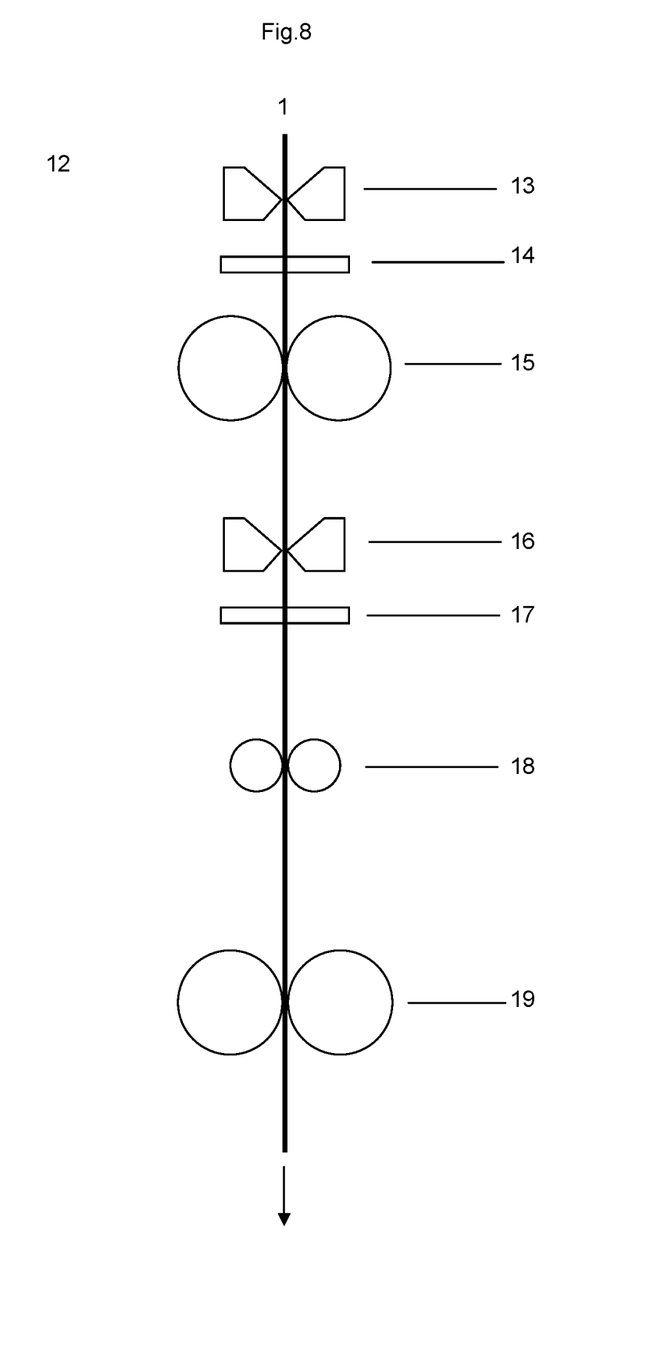
FIG. 8 shows a wire stripping machine according to the invention.

FIG. 8 shows a preferred embodiment of a wire stripping machine 12 according the present invention. As said previously, such a machine should preferably be able to strip out small portions of a continuous wire, which is scrolled through the machine before being delivered to other manufacturing stations (for example such as wire embedding, etc.).

When in the machine 12, the wire 1 is pulled at least by driving barrels (or rollers) 19 at a predetermined linear speed. Typically, as a non-limiting example, this speed is about 6,000±2,000 mm/min.

Preferably, a pre-scraper 13 is applied on the insulation of the wire (on a portion of the wire where the insulation is to be removed later in the process) and a pre-scraping operation is carried out. Typically, the pre-scraper 13 is similar to the stripping device illustrated in FIG. 2 with a set aperture between the jaws that is not sufficient to strip the wire but still enough to scrape a small part of the insulation (see FIG. 3). In order to recover the particles freed by this pre-scraping operation, a first particle filter guide 14 is used just after the pre-scraper 13. Once the pre-scraping operation is finished, the pre-scraper jaws are opened.

The pre-scraped portion of the wire then arrives at the flattening barrels (rollers) 15 and the barrels are closed. The flattening barrels are used to flatten the portion of wire that is to be stripped bare according to the principle of the invention. Once the chosen portion of the wire has been flattened the flattening barrels 15 are open.

The flattened portion of the wire then reaches the scraper 16 (similar to the scraper described above in relation to FIG. 2) and the isolation of the flattened portion is removed in accordance with the principles of the present invention. Next to the scraper 16, there preferably is a second particle filter guide 17 which is used to recover the particles created by the scraping operation. Once the scraping operation is finished the scraper 16 jaws are opened and the wire is further pulled by the driving barrels 19.

In addition, there are sensors barrels 18 provided in the machine. These sensors are used to control the portion of the wire that has been stripped, i.e. the fact that it has been properly (and sufficiently) stripped. The sensors used can be electrical sensors, but also optical sensors (for example detecting the difference of reflection between the insulation of the wire and the flattened and bare wire portion). Other detecting means are of course possible as well in the frame of the present invention.

Figure 9:
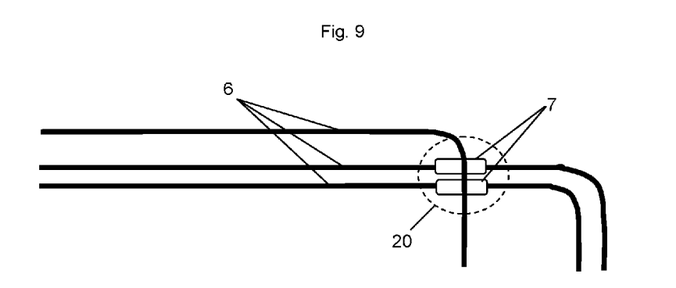
FIG. 9 shows a top view of a crossover bridge.
Figure 10:
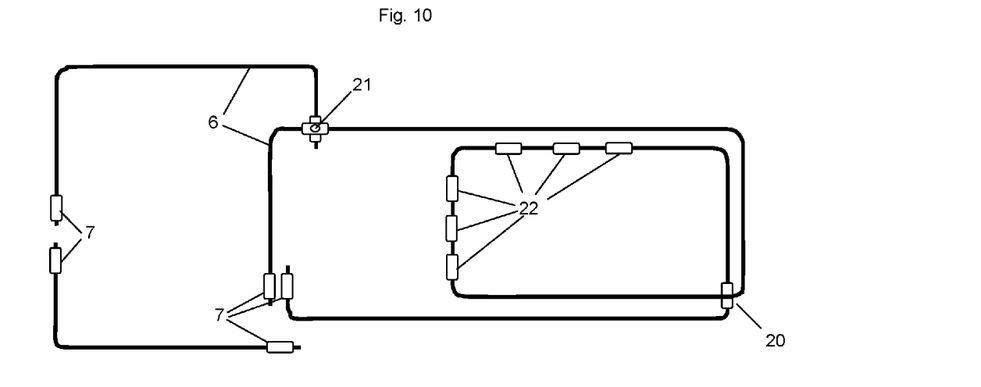
FIG. 10 shows a top view of an antenna circuit according to the invention.

FIGS. 9 and 10 illustrate different embodiments of wire arrangements that can be realized with the principles of the invention.

In FIG. 9, the example illustrated is an antenna with a cross-over bridge 20 having two flattened zones made of flattened portions of wire 7. Preferably, the zones 7 are firstly used for their flattened properties, meaning that they allow a crossing of the wires without increasing substantially the thickness of the crossing. Indeed, as the crossing is made in a zone where the wires have been flattened, the thickness of the zone is less than the addition of the thickness of each wire.

This zone can also be used to yield capacitances at the cross-over zone, in accordance with the teaching of U.S. Pat. No. 5,541,399 which is incorporated by reference in the present application to this effect.

FIG. 10 illustrates another embodiment of wires with flattened and bare portions 7, this figure showing several examples of possible use of the flattened portions created according to the present invention.

For example, on the left side of FIG. 10, the two flattened and bare facing portions of wire 7 can be used as a switch zone to enable the functioning of the wire 6 as an antenna. An example of such a switch is given in EP 1 868 140 A1 incorporated by reference to this effect in the present application. In this prior art application, use is made of a contacting material that becomes conductive under pressure, said material being disposed between two contact zones of the antenna. Accordingly, the antenna is functional only when the contact material is put under pressure.

These two flattened and bare facing portions of wire 7 can also be used as contacts for a RFID chip for example, according to principle known in the art.

Similarly, the three contacts 7 shown in the middle of FIG. 10 can be used as switches or contacts for RFID chips, as mentioned above.

The contacting hole 21 (represented in the middle and at the top of FIG. 10) illustrates another use of the flattened and bare portions according to the invention. In this case, they are used to contact two wires together in a simple and efficient way. To improve the contacting, a contacting hole 21 can be used, but this is an option. This is mainly to illustrate how wires could be connected together in a simple way using the principle of the invention.

On the right side of FIG. 10, another use of the stripped and flattened portions of the invention is illustrated. In this case, there is a succession of flattened portions 22 along the wire 6. This succession of flattened and bare portions can be used as a watermark, i.e. as a security element. Typically, such a watermark can be purely optical (where such portions can be readily seen or detected optically) or also they can induce magnetic/electric effects for their detection. Of course, any number and/or configuration and/or shape of such portions may be envisaged in the frame of the present invention and is not limited to the example illustrated in FIG. 10.

On the right side of FIG. 10, a bridge similar to the one described with reference to FIG. 9 is illustrated once again.

As one will readily understand, different uses of the bare and flattened portions of a wire are possible and these different uses may also be combined together, as illustrated in FIG. 10.

Figure 11:
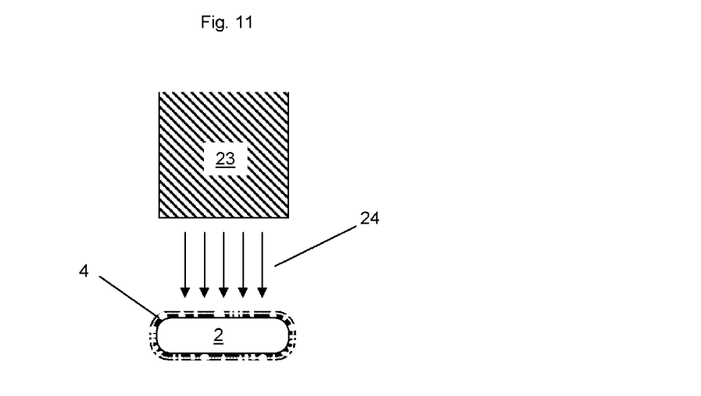
FIG. 11 shows a wire being stripped by laser radiation according to the invention.

FIG. 11 illustrates schematically an embodiment in which a laser (or other equivalent means) is used to remove the insulation layer of the wire core 2. This example illustrates an optical fiber 23 which projects a laser radiation 24 onto the insulation of the flattened wire, typically replacing the scraper 16 of FIG. 8. Of course it is possible to combine the technologies and to use a laser in combination with a scraper, according to the principles of the present invention.

An advantage of using a laser is the fact that it can be used to remove a selected part of the insulation of the flattened portion, for example one side of the flattened portion only. Such a result is difficult to obtain with a mechanical system, for example using scrapers as described above.

LIST OF NUMERICAL REFERENCES 1 insulated wire
2 wire core
3 insulation layer (as 3')
4 cracked insulation layer
5 stripped flat surface of wire
6 insulated portion of wire
7 bare/stripped and flattened portion of wire
8 jaw of a scraper
9 scraping edge
10 scraped insulation particles
11 stripped surface of non flattened wire
12 wire stripping machine
13 pre scraper
14 first particle filter guide
15 flattening barrels
16 scraper
17 second particle filter guide
18 sensor barrels
19 driving barrels
20 crossover bridge
21 contacting hole
22 flattened bare wire surfaces used as watermarks
23 end of fiber optic cable
24 laser radiation

What is claimed is:

1. A wire antenna comprising:
   a. an inner metal core having a circular cross section;
   b. an insulation layer disposed around the core;
   c. the metal core and insulation layer having a length defining an axis;
   d. the metal core further comprising a flattened portion having a first flat outer surface and a second flat outer surface spaced from the first flat surface by a first dimension, and wherein the first and second flat outer surfaces each have a first edge and a second edge parallel with the wire axis, and a first curved surface interconnecting the first edges of the first and second flat outer surfaces and a second curved surface interconnecting the second edges of the first and second flat outer surfaces, and wherein the first curved surface is spaced from the second curved surface by a second dimension, and wherein the second dimension is at least twenty percent larger than the first dimension, and wherein the insulation layer is absent from at least a portion of the first flat outer portion.

2. The wire antenna of claim 1, wherein the metal core comprises one of copper or silver.

3. The wire antenna of claim 1, wherein the insulation layer comprises one of lacquer or enamel.

4. The wire antenna of claim 1, wherein the plastic properties of the metal core are different from the insulation layer.

5. The wire antenna of claim 1, wherein the insulation layer is absent from at least a portion of the second flat outer portion.

6. The wire antenna of claim 5, wherein the insulation layer is absent from substantially all of the first and second flat outer portions.

7. The wire antenna of claim 6, further comprising an aperture formed completely through the flattened portion from the first flat outer surface to the second flat outer surface.

8. The wire antenna of claim 1, wherein the second dimension is approximately fifty percent larger than the first dimension.

9. The wire antenna of claim 1, wherein the circular cross section of the wire and insulation layer at a location different from a flattened portion has a diameter equal to or less than 250 micrometres.

10. The wire antenna of claim 1, wherein the circular cross section of the wire and insulation layer at a location different from a flattened portion has a diameter equal to or less than 100 micrometres.

11. The wire antenna of claim 1, wherein the insulation layer comprises a first insulation layer and a second insulation layer disposed around the first insulation lawyer, and wherein the second insulation layer is absent from the at least first flat outer portion where the first insulation layer is absent.

12. The wire antenna of claim 11, wherein the first and second insulation layers are absent from substantially all of the first and second flat outer portions.

13. The wire antenna of claim 12, wherein the second insulation layer comprises one of baked enamel, adhesive or thermosetting plastic.

14. The wire antenna of claim 1, wherein the metal core has a first end and a second end and the flattened portion is located between the first and second ends.

15. The wire antenna of claim 1, further comprising a second flattened portion having a first flat outer surface and a second flat outer surface spaced from the first flat surface by a first dimension, and wherein the first and second flat outer surfaces each have a first edge and a second edge parallel with the wire axis, and a first curved surface interconnecting the first edges of the first and second flat outer surfaces and a second curved surface interconnecting the second edges of the first and second flat outer surfaces, and wherein the first curved surface is spaced from the second curved surface by a second dimension, and wherein the second dimension is at least twenty percent larger than the first dimension, and wherein the insulation layer is absent from at least a portion of the second flattened portion.

16. The wire antenna of claim 15, wherein the first and second flattened portions comprise a wire crossing.

17. The wire antenna of claim 15, wherein the first and second flattened portions comprise a watermark.

18. The wire antenna of claim 1, wherein the metal core has a first end and a second end and the flattened portion is located proximate the first end.

19. The wire antenna of claim 1, wherein the flattened portion forms a contact surface to connect an electronic element that includes at least one of a chip, a module, and a switch.

20. A wire antenna comprising:
   a. a first wire inner metal core having a circular cross section;
   b. a first insulation layer disposed around the first wire metal core;

c. the first wire metal core and first insulation layer having a length defining an axis;
d. the first metal core further comprising a first flattened portion having a first flat outer surface and a second flat outer surface spaced from the first flat surface by a first dimension, and wherein the first and second flat outer surfaces each have a first edge and a second edge parallel with the wire axis, and a first curved surface interconnecting the first edges of the first and second flat outer surfaces and a second curved surface interconnecting the second edges of the first and second flat outer surfaces, and wherein the first curved surface is spaced from the second curved surface by a second dimension, and wherein the second dimension is at least twenty percent larger than the first dimension, and wherein the insulation layer is absent from at least a portion of the first flat outer portion;
e. a second wire inner metal core having a circular cross section;
f. a second insulation layer disposed around the second wire metal core;
g. the second wire metal core and second insulation layer having a length defining an axis;
h. the second metal core further comprising a second flattened portion having a first flat outer surface and a second flat outer surface spaced from the first flat surface by a first dimension, and wherein the first and second flat outer surfaces each have a first edge and a second edge parallel with the second wire axis, and a first curved surface interconnecting the first edges of the first and second flat outer surfaces and a second curved surface interconnecting the second edges of the first and second flat outer surfaces, and wherein the first curved surface is spaced from the second curved surface by a second dimension, and wherein the second dimension is at least twenty percent larger than the first dimension, and wherein the insulation layer is absent from at least a portion of the second flat outer portion;
i. and wherein the first and second flattened portions are connected.

* * * * *